United States Patent

Durand

[15] 3,707,212
[45] Dec. 26, 1972

[54] DEVICE FOR TRANSMITTING MOTION

[72] Inventor: Francois Durand, 108 Boulevard Carnot, Le Vesinet, France

[22] Filed: June 7, 1971

[21] Appl. No.: 150,455

[52] U.S. Cl. ................................. 192/150, 74/410
[51] Int. Cl. ............................. F16p 3/00, F16h 57/00
[58] Field of Search ................. 74/410, 411; 192/150

[56] References Cited

UNITED STATES PATENTS

| | | | |
|---|---|---|---|
| 2,431,428 | 11/1947 | Semar | 74/410 X |
| 3,167,975 | 2/1965 | Durand | 74/410 X |
| 3,299,729 | 1/1967 | Durand | 74/410 X |
| 3,388,608 | 6/1968 | Durand | 74/410 |
| 3,397,591 | 8/1968 | Delescluse | 74/410 |
| 3,407,911 | 10/1968 | Rosbottom | 192/150 |
| 3,461,735 | 8/1969 | Durand | 74/410 |

*Primary Examiner*—Allan D. Herrmann
*Attorney*—Michael S. Striker

[57] ABSTRACT

In this device for transmitting motion to a large gear two driving pinions are in constant meshing engagement therewith and disposed at spaced intervals; these pinions are rotatably mounted on separate supports carrying a roller engaging a race formed concentrically on said gear, said supports being interconnected by a pair of coupling rods pivoted to a pair of retaining members each pivotally mounted about an axis parallel to the axis of the driven gear and interconnected in turn by a link of telescopic nature, with resilient means interconnecting in turn the sections of this link. One section of said interconnecting link is adapted to actuate a switch for opening the energizing circuit of the motor driving said pinions when the relative movements accomplished by these sections exceed a predetermined limit.

3 Claims, 4 Drawing Figures

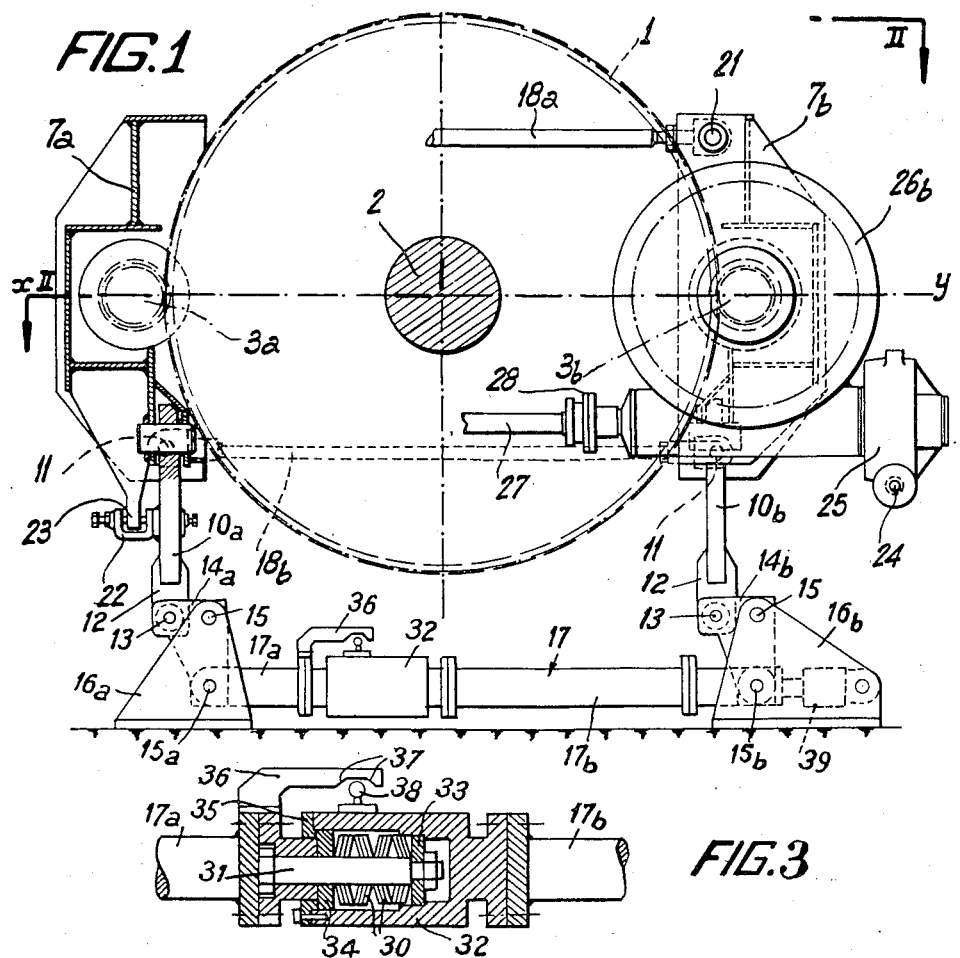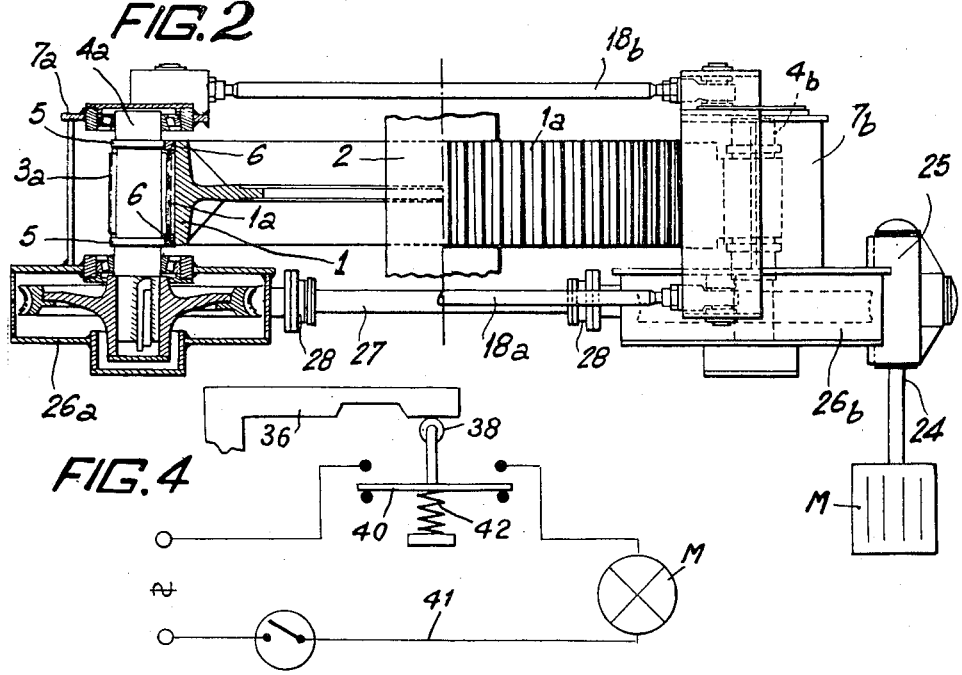

3,707,212

DEVICE FOR TRANSMITTING MOTION

BACKGROUND OF THE INVENTION

The present invention relates to devices for transmitting motion through a pinion to a gear of relatively large size. More particularly, this invention is directed to provide a transmission device capable of driving such large gear by means of at least two pinions in meshing engagement with said gear, with automatic adaptation of the meshing engagement of the teeth of each pinion with those of the gear.

DESCRIPTION OF THE PRIOR ART

The device according to this invention is substantially of the type described in the U.S. Pat. No. 3,388,608 in the applicant's name.

In fact, in this prior patent the two driving pinions are mounted in a pair of separate movable supports interconnected by tie-rods, each support being held against movement in the tangential direction by a coupling rod. On the other hand, a compensation system interconnecting these two coupling rods is provided for automatically apportioning the stress applied to the two driving pinions.

However, the device according to this invention is designed with a view to reduce considerably its overall dimensions in comparison with the device described and illustrated in the aforesaid U.S. Pat. No. 3,388,608, of which the dimension in the vertical direction, i.e., between the floor and the axis of the driven gear, was very considerable.

SUMMARY OF THE INVENTION

In order to obtain the desired reduction in the overall dimension of the device, a different approach is made to the problem of interconnecting the two coupling rods of the driving pinion supports. In fact, in the device according to this invention these coupling rods are pivoted to a pair of retaining members each pivotally mounted about an axis parallel to the axis of the driven gear, these two members being interconnected by a link having its ends pivotally attached to said members, respectively.

According to an advantageous form of embodiment of this device the interconnecting link disposed between the two pivoting members is of telescopic nature and comprises therefore two sections adapted to slide in mutual alignment, and these sections are interconnected in turn by resilient means. On the other hand, one of the two component sections of this telescopic link carries a member adapted to actuate an electric switch inserted in the control circuit of the motor driving the gear-driving pinions, the arrangement being such that a predetermined relative movement of the two sections of said interconnecting link is adapted to open said switch.

BRIEF DESCRIPTION OF THE DRAWING

In the drawing:

FIG. 1 is a part-elevational, part-sectional view of a typical form of embodiment of the gear driving device of this invention;

FIG. 2 is a section taken along the broken line II—II of FIG. 1,

FIG. 3 is a sectional view showing a detail of the interconnecting link provided between the two pivoting retaining members, and FIG. 4 is a wiring diagram.

DESCRIPTION OF PREFERRED EMBODIMENTS

The transmission device illustrated in the drawing is designed to drive a gear 1 supported on a shaft 2, through the medium of two pinions 3a and 3b. Said pinions are disposed on either side of the gear, in diametrically opposed positions on a diameter $x$–$y$ of said gear. They are respectively driven by shafts 4a and 4b supported in cradle-shaped mountings 7a and 7b respectively, said shafts 4a and 4b being journaled in said mountings.

Each shaft 4a (or 4b) supports, on either side of the corresponding pinion 3a (or 3b), two rollers 5 positioned in contact with two guiding tracks 6 which are provided on the periphery of gear 1 and arranged on each side of the gear toothed rim 1a. Said two guiding tracks are disposed concentrically with said rim and the sum of the diameters of each roller 5 and its associated track 6 is equal to the sum of the pitch diameters of the pinion 3a (or 3b) and the gear 1.

Each cradle-like support 7a, and 7b is held against motion in the tangent direction by coupling rods 10a and 10b respectively, each coupling rod having one end pivotally attached at 11 to the corresponding support through universal joint means, for example of the ball-and-socket type. The opposite end 12 of each coupling rod is pivoted by means of a universal joint 13 to a pivoting retaining member designated by the symbols 14a and 14b, respectively.

These retaining members are pivotally mounted to a pair of fixed pins 15 parallel to the shaft 2 supporting the driven gear. These pivot pins are carried in turn by a pair of fixed brackets 16a and 16b, respectively.

The pair of retaining members 14a and 14b are interconnected by a link 17 substantially parallel to the plane containing not only the axis of the driven gear shaft 2 but also the axes of shafts of driving pinions 3a and 3b.

Thus, in the example illustrated, these three axes lie in a common horizontal plane, whereby the connecting link 17 itself lies in a horizontal plane.

The two cradle-like supports 7a, 7b are interconnected by a pair of tie-rods 18a, 18b. These tie-rods are disposed on either side of the plane containing the axis $x$–$y$ extending at right angles to the axis of the shaft 2 of toothed wheel 1 and the axes of both pinions 3a and 3b (see FIG. 1). However, these tie-rods are also disposed on either side of the two faces of gear 1 (see FIG. 2). The ends of these two tie-rods are pivotally attached to the cradle-like supports 7a, 7b by means of universal joints, for example ball-and-socket joints 21.

Moreover, an abutment system is provided for limiting the amplitude of the movements of at least one of the two cradle-like supports 7a and 7b. Thus, in the example illustrated an abutment system is contemplated which is adapted to limit the amplitude of the movements of support 7a, this system comprising a U-shaped member 22 carried by the coupling rod 10a, the two arms of this member 22 being disposed on either side of a lug 23 rigid with the support 7a. Thus, this member is positively capable of limiting the amplitude of the movements of support 7a. However, since this support 7a is connected through the tie-rods 18a, 18b to the other support 7b, the amplitude of the movements of this other support is similarly limited.

The shafts 4a and 4b of pinions 3a and 3b respectively may be driven from a single power shaft 24 of an electric motor m through a worm and wheel reduction gearing 25. The output shaft of this reduction gearing is coupled to the shaft 4b of pinion 3b through the medium of a transmission mechanism of the worm and wheel type. Besides, the output shaft of reduction gearing 25 is coupled to another shaft 27 leading to another worm and wheel reduction gearing to couple same with the shaft 4a of pinion 3b. Coupling joints 28 are provided at both ends of the connecting shaft 27.

With this mounting the cradle-like structure 7a or 7b supporting each pinion has a sufficient freedom of movement to be able to position itself in such a manner that the relevant pinion lies in the ideal position for meeting the three requirements characterizing a satisfactory meshing engagement between the pinion and the teeth of the large gear.

It may be noted that each pinion and its support are properly positioned automatically until the requirements characterizing a satisfactory meshing engagement are met. Thereafter the teeth of each pinion bear as perfectly as desired against the teeth of the large gear 1. It may be noted that the orientation of each support may be altered by pivoting same about the corresponding coupling rod 10a or 10b, which holds this support against tangential movement.

When a torque is transmitted through pinions 3a and 3b to the large gear 1 one of the coupling rods 10a or 10b is pulled and the other is pushed, according to the direction in which the torque is transmitted. However, irrespective of the torque direction, these two rods constantly work in opposition, i.e., one rod being traction stressed and the other compression stressed.

The reaction exerted by these rods on the retaining members 14a and 14b oscillating about pivot pins 15 produces reactions against the pivot pins 15a and 15b positioned at the ends of connecting link 17, whereby according to the direction of application of the transmitted torque this link is either compression stressed or traction stressed.

In either case the stress supported by the two driving pinions is apportioned automatically.

If for any reason the center of the driven gear 1 were displaced in the space, the two coupling rods 10a and 10b would be caused to follow this movement together with the supports or brackets 7a and 7b supporting the two pinions 3a and 3b. However, this movement is not attended by any change in the reaction exerted on the connecting link 17, which according to cases is either a traction reaction or a compression reaction. Consequently, the movement of said coupling rods 10a and 10b concomitantly with the shifting of the gear axis is attended by a movement of connecting link 17 to the right or to the left according as the center of said gear is shifted downwards or upwards.

Under these conditions, the connecting link 17 moves only in the horizontal plane. Therefore, the use of this link for balancing the stress supported by the two pinions is advantageous in that it affords a considerable reduction in the over-all dimensions of the device in comparison with those of the device described and illustrated in the above-mentioned U.S. Pat. No. 3,388,608 of the same applicant.

In fact, in the present instance it may be emphasized that a substantial reduction in the vertical dimension, i.e., between the floor and the axis of the driven gear, is obtained. This constitutes a substantial advantage when, in certain specific applications, relatively little room is available between the foundations and the lower portion of the gear to be driven.

Another advantageous feature characterizing this invention lies in the fact that this device is of simpler construction than the one disclosed in said prior U.S. Pat. No. 3,388,608.

According to an advantageous form of embodiment the connecting link 17 is telescopic and comprises to this end a pair of complementary sections 17a and 17b mutually aligned and adapted to slide in relation to each other. On the other hand these two link sections are interconnected by elastic device, for example and advantageously of the type illustrated in FIG. 3.

This device comprises one or a plurality of elastic elements such as dished washers 30 centered to a rod 31 carried by the outer end of link section 17a. This assembly is enclosed in a socket 32 carried by the end of the opposite link section 17b.

Now these elastic elements are disposed between a pair of flat washers 33,34 of which the former is secured to the end of rod 31 and the other is abutting against a shoulder 35 formed inside the socket 32.

Therefore, this device is capable of damping out the shocks likely to be produced during the relative movements of said link sections 17a and 17b.

However, a safety system adapted automatically to stop the pinion driving motor in case of abnormal increment in the transmitted torque may be provided in combination with this elastic device.

This safety system consists simply of an electric switch 40 inserted in the control circuit 41 of the motor m driving said pinions, this switch being adapted to be opened by a control member carried by one of said link sections 17a and 17b.

This control member may consist for example of an arm 36 formed with two control cam faces 37 disposed on either side of the control knob 38 of said switch 40. In this case a suitable clearance or lost motion is provided between each cam face and said knob.

Under these conditions, the switch 40 is opened automatically against the action of the spring 42 to stop the driving motor whenever the transmitted torque exceeds a predetermined limit.

It may also be noted that the distance contemplated between each pivot pin 13 and the corresponding fulcrum 15, as well as the distance between each pivot pin 15a or 15b and the relevant fulcrum 15, permit of demultiplying the transmitted stress so that the tractive effort supported by the connecting link 17 corresponds simply to a sub-multiple of the actual stress received by the coupling rods 10a, 10b. This is advantageous in that the elastic elements interposed between the two sections 17a and 17b of link 17 can be dimensioned for receiving stress of lesser magnitude.

On the other hand it may be noted that in the example illustrated the arrangement contemplated permit of absorbing the inherent weight of supports 7a and 7b of both driving pinions, including the primary structure, as well as the inherent weight of coupling rods 10a and 10b, this result being obtained by virtue of a pressure member acting upon one end of said connecting link 17. This is due to the fact that in this specific form of embodiment the connecting link is disposed horizontally beneath the driven gear and the pair of driving pinions.

Therefore, the inherent weight of the above-mentioned elements may be supported by a pressure member such as a simple cylinder and piston actuator 39 acting on one of the ends of said link 17, i.e., on the pivot pin 15b through which said link 17 is connected to the pivoted retaining member 14b.

However, it may be emphasized that this actuator receives but a sub-multiple of the inherent weight of the above-mentioned elements, and that likewise the connecting link 17 supports only a sub-multiple only of the stress transmitted through the coupling rods 10a and 10b.

On the other hand, since this actuator is in axial alignment with the link 17, its presence does not increase in any way the overall dimensions of the device, especially in the vertical direction. Besides, as already mentioned in the foregoing, this reduction in the overall dimensions constitutes an essential feature of the present device in comparison with that described in said prior patent.

Of course, the present invention should not be construed as being strictly limited to the single form of embodiment shown and described herein, since various modifications and variations may be brought thereto without departing from the basic principles of the invention as set forth in the appended claims.

What I claim is:

1. Device for transmitting motion to a relatively large gear provided with peripheral teeth, which comprises in combination at least two driving pinions disposed at spaced intervals about said gear and in constant meshing engagement therewith, at least two supports independent of each other, each pinion being rotatably mounted in one of said supports, at least one race formed on said gear and concentric to its teeth, at least one roller mounted in each one of said supports and concentric to the relevant driving pinion, said roller being urged against said gear race, a coupling rod connecting each support to a retaining member adapted to hold each support against movement in the tangential direction, fixed pivot pins parallel to the gear axis and having each pivotally mounted thereon one of said retaining members, a connecting link having its ends pivoted to one and the other of said retaining members respectively and disposed substantially parallel to the plane containing the axis of said driven gear and the axes of said pair of driving pinions, a pair of tie-rods interconnecting said supports, which are disposed on either side of the plane containing the gear axis and the pinion axes, and on either side of the two main faces of said gear, and abutment means co-acting with at least one of said supports for limiting the amplitude of the movements thereof.

2. A transmission device as set forth in claim 1, wherein the link interconnecting said pair of pivoting members is of telescopic nature and comprises consequently two sections adapted to slide in mutual alignment and connected by an elastic device, one of said sections carrying a member adapted to actuate a switch inserted in the circuit controlling the motor driving said pinions, the arrangement being such that a predetermined relative movement of said elements of said connecting link is attended by the opening of said switch.

3. A transmission device as set forth in claim 1, wherein the connecting link disposed between said pair of pivoting retaining members is disposed horizontally beneath said driven gear and said pair of driving pinions, a thrust member acting on one end of said connecting link being also provided.

* * * * *